(12) United States Patent
Chai et al.

(10) Patent No.: US 8,796,900 B2
(45) Date of Patent: Aug. 5, 2014

(54) ELECTRIC MOTOR

(75) Inventors: Ji Dong Chai, Shenzhen (CN); Yan Nian Liu, Shenzhen (CN); Liang Guan, Shenzhen (CN); Bao Ting Liu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 141 days.

(21) Appl. No.: 13/601,536

(22) Filed: Aug. 31, 2012

(65) Prior Publication Data

US 2013/0057089 A1 Mar. 7, 2013

(30) Foreign Application Priority Data

Sep. 2, 2011 (CN) .......................... 2011 1 0259949

(51) Int. Cl.
*H01R 39/04* (2006.01)

(52) U.S. Cl.
USPC .................. 310/233; 310/154.33; 310/154.01

(58) Field of Classification Search
USPC ........ 310/233–236, 154.01–154.54, 264–265
See application file for complete search history.

(56) References Cited

U.S. PATENT DOCUMENTS

| | | | | |
|---|---|---|---|---|
| 4,910,790 A | * | 3/1990 | Kershaw | 388/836 |
| 5,434,463 A | * | 7/1995 | Horski | 310/248 |
| 6,737,774 B1 | | 5/2004 | Shin | |
| 7,332,843 B2 | * | 2/2008 | Tsukamoto | 310/90 |
| 7,656,063 B2 | * | 2/2010 | Tsukamoto | 310/51 |
| 7,859,164 B2 | * | 12/2010 | Qin et al. | 310/216.071 |
| 2010/0183460 A1 | * | 7/2010 | Qin et al. | 417/423.7 |
| 2010/0295404 A1 | * | 11/2010 | Li et al. | 310/158 |

FOREIGN PATENT DOCUMENTS

DE 10061381 7/2001

* cited by examiner

*Primary Examiner* — Thanh Lam
(74) *Attorney, Agent, or Firm* — Muncy, Geissler, Olds & Lowe, P.C.

(57) ABSTRACT

An electric motor has a stator, a rotor and brush gear. The rotor includes a shaft, a rotor core fixed to the shaft, a commutator fixed to the shaft, and rotor windings wound on the rotor core and electrically connected to the commutator. The brush gear includes at least two arcuate brushes for making sliding contact with the commutator. The commutator and brush gear are disposed within a space formed in the rotor core to minimize the axial length of the motor.

18 Claims, 5 Drawing Sheets

ELECTRIC MOTOR

CROSS REFERENCE TO RELATED APPLICATIONS

This non-provisional patent application claims priority under 35 U.S.C. §119(a) from Patent Application No. 201110259949.X filed in The People's Republic of China on Sep. 2, 2011.

FIELD OF THE INVENTION

This invention relates to a flat brush motor and in particular, to a cooling fan motor.

BACKGROUND OF THE INVENTION

A cooling fan is widely used in an engine cooling system for a vehicle. The cooling fan is typically driven by a direct current (DC) brush motor. It is desired to reduce the axial dimension of the motor to provide more space for other components of the engine, without reducing the lifespan of the motor.

U.S. Pat. No. 6,737,774B discloses a cooling fan motor with a flat structure. The motor has a housing with a magnet attached to an inner surface there of, an end cap closing one end of the housing, a rotor core fixed to a shaft, a rotor winding held at an outer circumference of the rotor core, and brushes for supplying power from a battery to the rotor winding. A commutator is partly arranged in a space defined by the shaft, the rotor core and an inner surface of the rotor winding. The brushes are axially spaced from the winding and fixed to the end cap to make sliding contact with segments of the commutator.

U.S. Pat. No. 5,434,463 discloses a motor with a flat structure in which the commutator is disposed in a recess that extends further into the body of the rotor core. However, the manufacture of this motor is relatively complex with the rotor core being formed from a number of different laminations being stacked together.

SUMMARY OF THE INVENTION

Hence there is a desire for a motor with a flat structure which is relatively easy to manufacture in mass production.

In one aspect, the present invention provides an electric motor comprising: a stator having a number of permanent magnet stator poles; brush gear with at least two brushes; and a rotor comprising a shaft, a rotor bracket fixed to the shaft, a ring shaped rotor core fixed to the rotor bracket, a commutator fixed to the shaft and arranged inside the rotor core, and rotor windings wound on the rotor core and electrically connected to the commutator, the commutator comprising an electrically insulating body, a plurality of segments spaced on the body, and a plurality of terminals respectively electrically connected to the segments, each terminal having a connecting portion for engaging a lead wire of the rotor windings, wherein a radially outer surface of the rotor bracket is press-fitted to a radially inner surface of the rotor core.

Preferably, the rotor bracket is fixed to the rotor core at one axial end of the rotor core.

Preferably, the rotor bracket comprises a support press-fitted to the rotor core, and an overmould member overmolded on the support.

Preferably, the rotor bracket is fixed to the shaft by a shaft sleeve at least partially embedded in the overmould member.

Preferably, the terminals of the commutator are partly embedded in the overmould member, with the connecting portions and the segments being arranged on opposite sides of the overmould member.

Preferably, the overmould member and the body are integrally formed.

Alternatively, the overmould member is molded to an inner surface of the body.

Preferably, the brushes are arcuate and disposed in an annular space defined by the rotor bracket, the rotor core and the commutator.

Preferably, at least one inclined opening is formed in the rotor bracket.

Preferably, the motor is incorporated in a fan for an engine cooling system for a vehicle, having a hub; and a plurality of blades outwardly extending from the hub, wherein the hub is fixed to the shaft to rotate there with.

In the embodiments of the present invention, by receiving the arcuate brushes in the annular space defined by the rotor bracket, rotor core and the commutator, the axial dimension of the motor can be reduced and longer brushes can be used. The inclined openings on the rotor bracket guide powder generated by the brushes out from the space to reduce dust build up on the commutator. As the rotor bracket is formed by the support and the overmould member, the mechanical strength of the rotor bracket can be assured. Furthermore, the manufacturing process of the rotor is simple as the rotor bracket and the body of the commutator may be integrally formed. By embedding the conductive terminals of the commutator in the overmould member, stable support for the terminals can be obtained.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
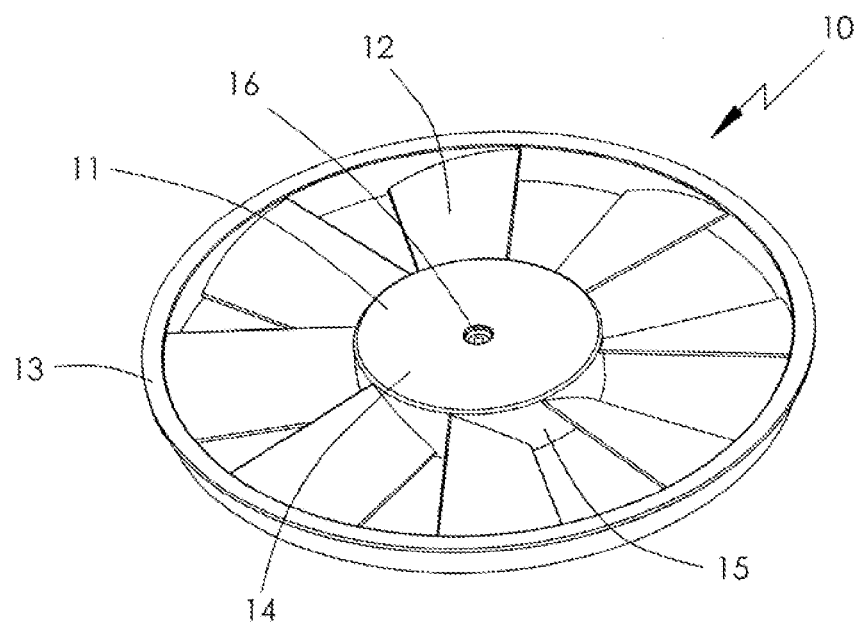
FIG. 1 is a view of a fan for an engine cooling system for vehicles in accordance with the present invention.

FIG. 1 is a view of a fan 10 for an engine cooling system for vehicles. The fan 10 includes a hub 11, a plurality of blades 12 outwardly extending from the hub 11, and an outer ring 13 connecting radially outer ends of the blades 12. The hub 11 has a base plate 14 and an annular side wall 15 axially extending from the outer periphery of the base plate 14. A connecting hole 16 is formed in the base plate 14. The base plate 14 and the side wall 15 define a space for receiving an electric motor for rotating the fan 10.

Figure 2:
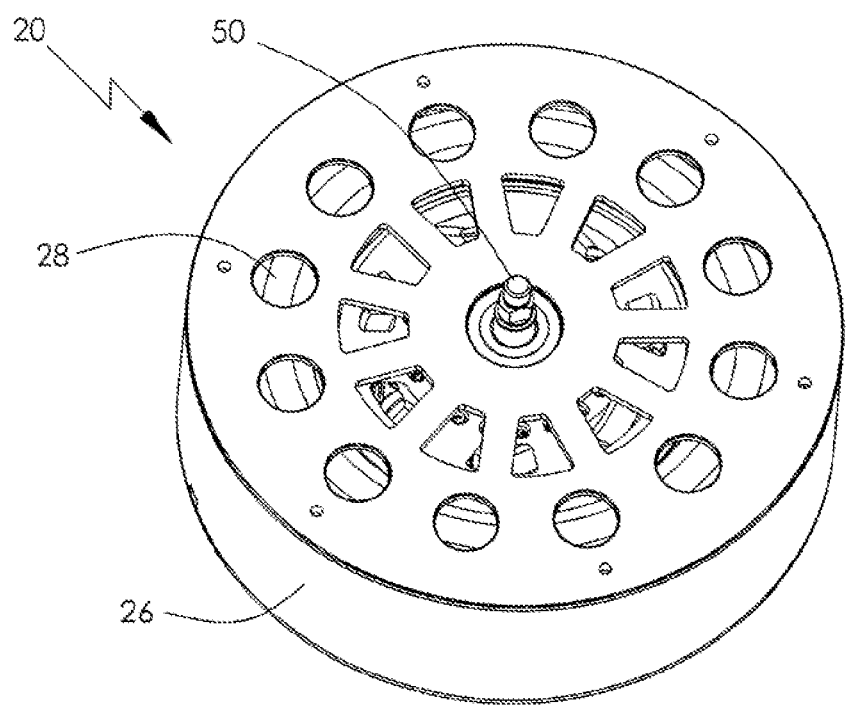
FIG. 2 is a view of an electric motor in accordance with a preferred embodiment of the present invention.
Figure 3:
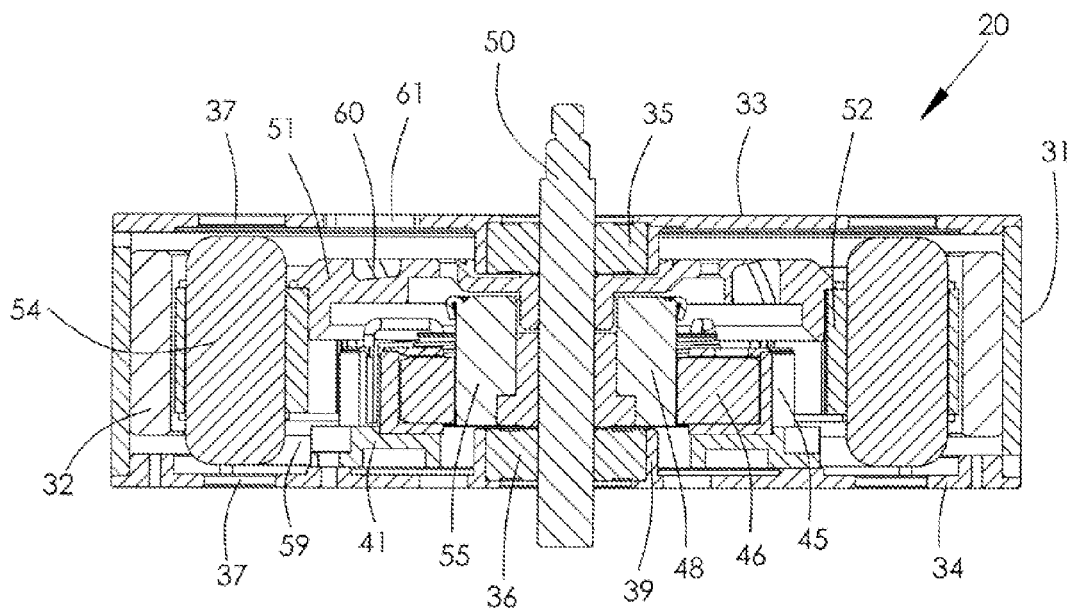
FIG. 3 is a sectional view of the motor of FIG. 2.

FIGS. 2 and 3 illustrate the electric motor 20 in accordance with a preferred embodiment of the present invention. The motor 20 is preferably a DC brush motor having a stator 26, brush gear and a rotor 28 rotatably mounted in the stator 26.

The stator 26 includes an axially-extending round housing 31 and a plurality of permanent magnets 32 fixed to the inner surface of the housing 31. First and second end caps 33, 34 close open axial ends of the housing 31. Bearings 35, 36 are fixed to the end caps 33, 34 for mounting the rotor. A plurality of ventilation holes 37 are formed in the first and second end caps 33, 34. The ventilation holes 37 allow air flow generated by the fan 10 to flow axially through the motor 20 to cool the motor 20. A brush unit 40 forming the brush gear, is assembled to the second end cap 34.

Figure 4:
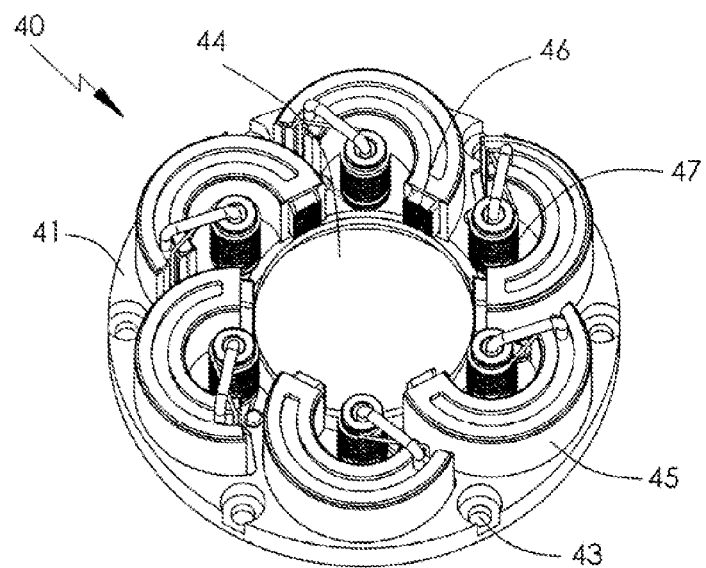
FIG. 4 is a view of a brush unit being a part of the motor of FIG. 2.

The brush unit 40, as shown in FIG. 4, includes a brush bracket 41 and a plurality of brush assemblies. The brush bracket 41 is fixed on the second end cover 34 via mounting holes 43. The brush bracket 41 has a central hole 44 to accommodate a bearing holder 39 for the bearing 36 of the second end cover 34. The brush assemblies are arranged on the brush bracket 41 at regular intervals in the circumferential direction. Each brush assembly has an arcuate brush cage 45 fixed on the brush bracket 41 and an arcuate brush 46 movably received in the brush cage 45 to make sliding contact with a commutator 48 of the rotor 28 under the urging of a resilient spring 47, which is a torsion spring in this embodiment. Preferably, the total number of stator poles formed by the permanent magnets 32 are four, six or eight. The total number of the brush assemblies is equal to the total number of stator poles.

Figure 5:
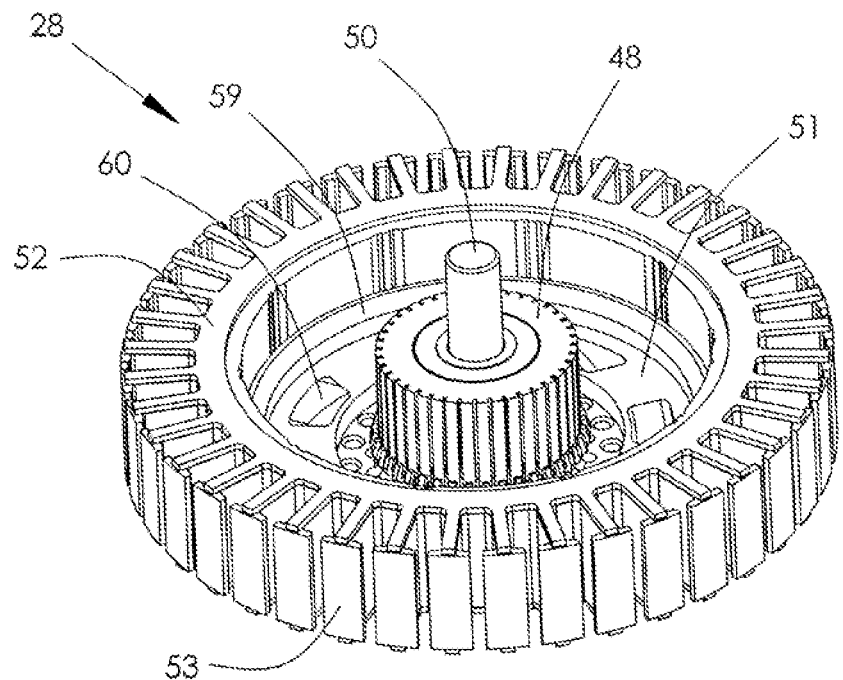
FIG. 5 is a view of a rotor being a part of the motor of FIG. 2, with rotor windings omitted.
Figure 6:
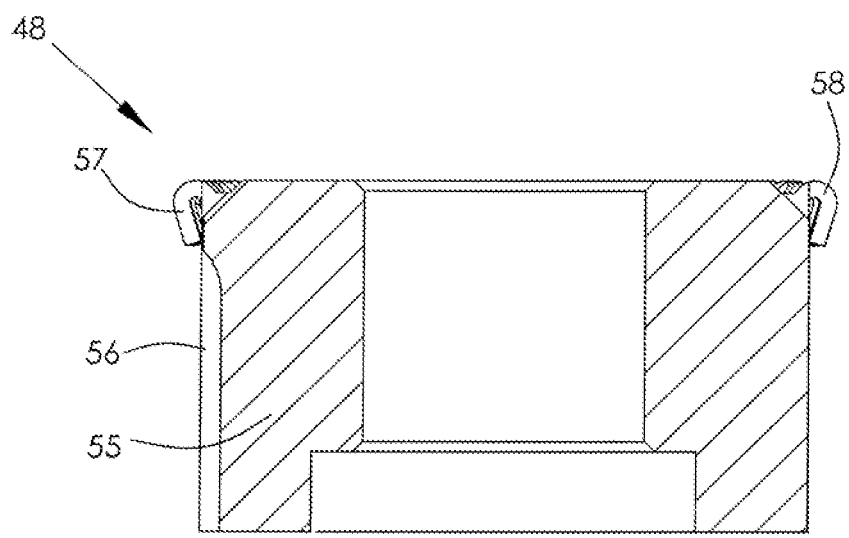
FIG. 6 is a sectional view of a commutator being a part of the rotor of FIG. 5.

FIG. 5 illustrates the rotor 28 with the windings removed to show the structure of the rotor. The rotor 28 includes a shaft 50, a circular rotor bracket 51 fixed to the shaft 50, a ring shaped rotor core 52 with a plurality of radially outwardly extending teeth 53, and a commutator 48 fixed to the shaft 50. Rotor windings 54 (shown in FIG. 3) are wound about the teeth 53 of the rotor core 52. The shaft 50 is rotatably supported by the two bearings 35, 36 and is inserted into and fixed to the connecting hole 16 of the hub 11 of the fan 10 so that the fan 10 rotates with the shaft. The ring shaped rotor core 52 is formed by axially stacking a plurality of ring shaped rotor laminations. The rotor bracket 51 is press-fitted to the inner surface of the rotor core 52 at one axial end of the rotor core adjacent the first end cap 33. The commutator 48 is disposed inside the rotor core 52 and adjacent to the rotor bracket 51. FIG. 6 is a sectional view of the commutator 48. The commutator 48 includes an electrically insulating body 55 and a plurality of electrically conductive segments 56 circumferentially spaced on the outer surface of the body 55. A terminal 57 integrally extends from one end of each segment 56 adjacent the rotor bracket 51. Each terminal 57 has a connecting portion 58 for making a connection with a lead wire 75 (shown in FIG. 8) of the rotor windings 54. The rotor bracket 51, the ring shaped rotor core 52 and the commutator 48 define an annular space 59. The brushes 46 are received in the space 59 to make sliding contact with the segments 56 of the commutator 48 such that external power can be supplied to the rotor windings 54 via the brushes 46 and the commutator 48. By receiving the brushes 46 in the space 59, the axial dimension of the motor 20 can be reduced. As the brushes 46 are arcuate, the brushes can be longer than if they were straight, thereby increasing the lifespan of the motor.

Preferably, the rotor bracket 51 has a plurality of inclined openings 60 which function as guiding structures for guiding powder generated as the brushes 46 wear, out from the space 59 and out of the motor via through holes 61 in the first end cap 33. The through holes 61 are roughly aligned with the inclined openings 60 in the radial direction. The dimension of the through holes 61 is equal to or greater than that of the inclined openings 60. The guiding structures do not extend beyond the rotor bracket 51 allowing the motor 50 to have a flat, compact structure.

Figure 7:
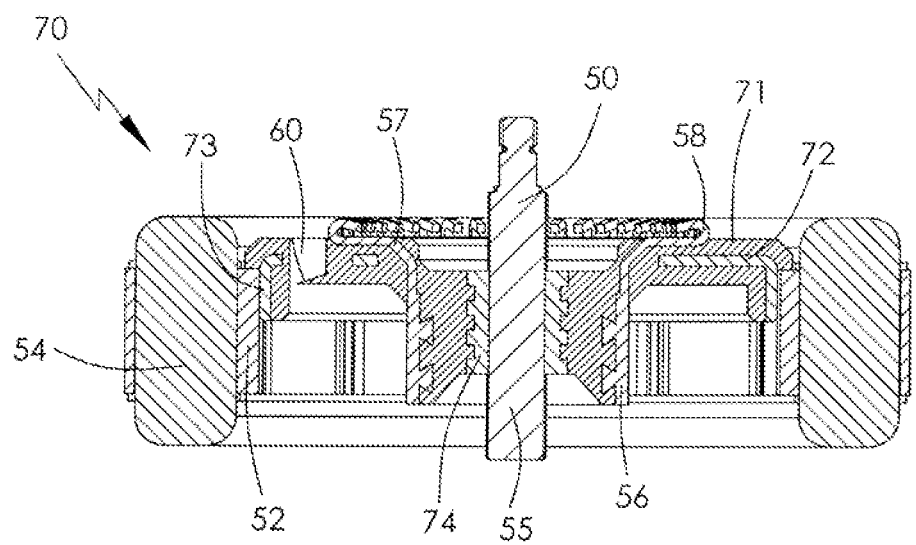
FIG. 7 is a sectional view of a rotor according to a second embodiment, with lead wires omitted.
Figure 8:
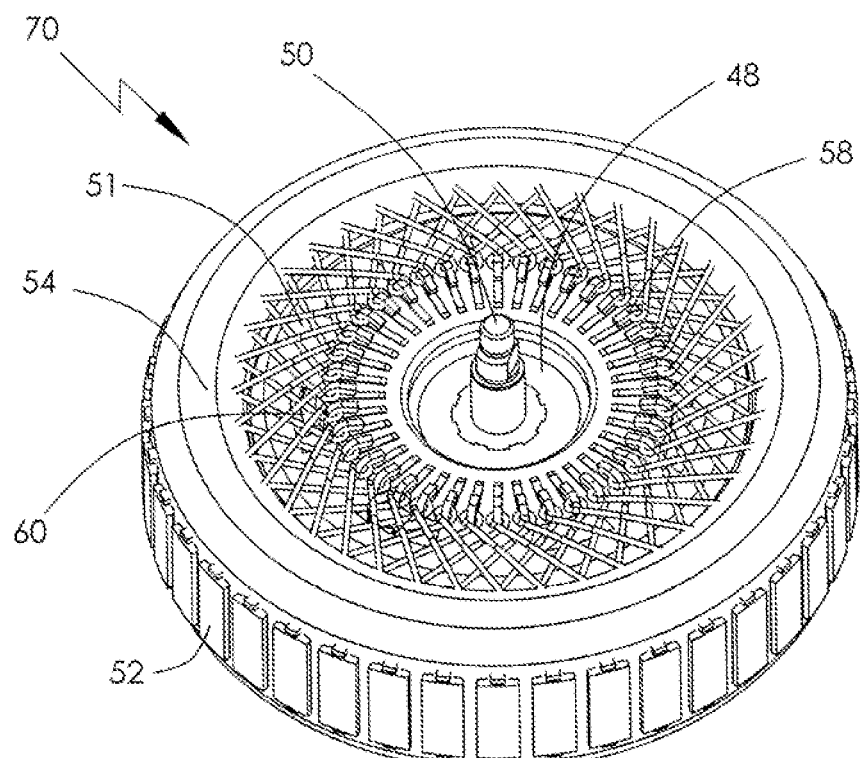
FIG. 8 is a view from above of the rotor of FIG. 7, with lead wires of rotor windings being shown.

FIGS. 7 and 8 show a rotor 70 according to a second preferred embodiment of the present invention. The rotor 70 is similar to the rotor 28. Compared with the rotor 28, the rotor bracket 51 of the rotor 70 includes an electrically insulating overmolded member 71 and a metal support 72 with holes and slots. The support 72 has a flat radial disc with an axially extending flange 73 extending from the radially outer edge of the disc. The disc has holes and/or slots through which the inclined openings 60 pass. The flange 73 is press-fitted to the inner surface of the rotor core 52 to hold the rotor core 52. The overmould member 71 and the body 55 of the commutator 48 are integrally molded, as a single monolithic structure, to the support 72 and the inner surfaces of the segments 56. The terminals 57 of the commutator 48 are partly embedded between the overmould member 71 and the body 55 while the connecting portions 58 and the segments 56 are disposed on opposite sides of the overmould member 71. Thus, the lead wires 75 of the rotor windings 54 can easily engage the connecting portions 58. The rotor bracket is fixed to the shaft 50 by a shaft sleeve 74 insert molded into a central hole of the commutator body 55. Thus the shaft sleeve is embedded in the overmould member with at least the inner surface of the sleeve exposed to make direct contact with the shaft when the shaft is pressed into the sleeve. In this embodiment, as the rotor bracket 51 is formed by the support 72 and the overmould member 71, the mechanical strength of the rotor bracket 51 can be assured. The manufacturing process of the rotor 70 is simple as the rotor bracket 51 and the body 55 of the commutator 48 are integrally formed. By embedding the terminals 57 in the overmould member 71, stable support for the terminals 57 is provided.

Figure 9:
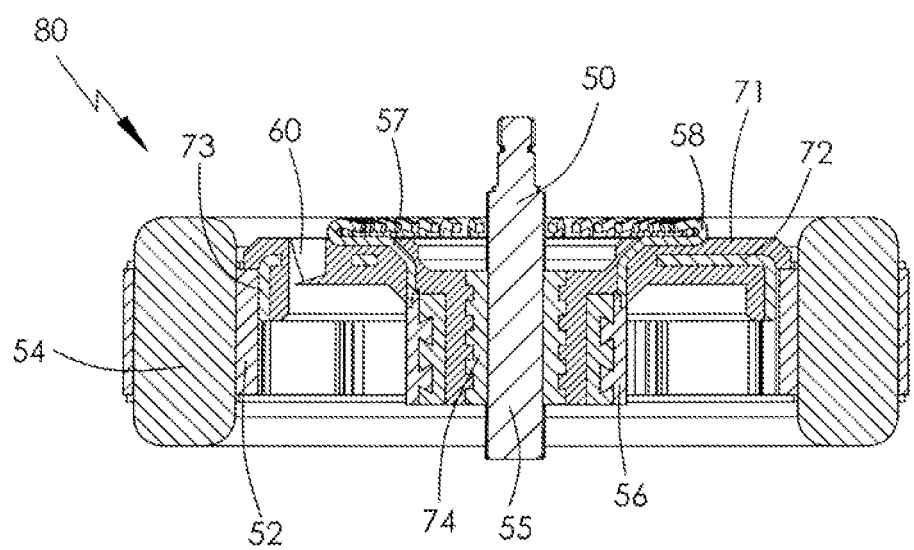
FIG. 9 is a sectional view similar to FIG. 7, of a rotor according to a third embodiment.

FIG. 9 shows a rotor 80 of the motor 20, according to a third embodiment. The rotor 80 is similar to the rotor 70. The rotor bracket 51 of the rotor 80 includes an electrical insulating overmould member 71 and a metal support 72. The flange 73 of the support 72 is press-fitted to the inner surface of the ring shaped rotor core 52 to hold the rotor core 52. Compared with the rotor 80, each segment 56 is separately formed and in contact with its corresponding terminal 57. The commutator is preformed with the commutator body being molded to the segments 56. The segments are connected to the terminals 57, preferably by soldering, prior to molding the overmould member 71. The overmould member 71 is molded over the support 72 and the inner surface of the body 55 of the commutator 48, with the terminals 57 of the commutator 48 being partly embedded in the overmould member 71 while the connecting portions 58 and the segments 56 are arranged on opposite sides of the overmould member 71. The shaft 50 is fixedly supported by the shaft sleeve 74 which is embedded in a central hole of the overmould member 71. Alternatively, the overmould member may be directly molded to the shaft. In this manner, the trueness of the commutator can be improved or assured, prior to assembling the commutator to the rotor bracket 51.

Alternatively, the terminals can be connected to the segments by a mechanical type connection, in which case the rotor bracket can be formed separately from the commutator, allowing the rotor to be fully wound and connected to the terminals before the commutator is fitted to the rotor bracket. Axial movement of the commutator in to position on the rotor bracket causes the segments to be electrically connected to the terminals by the mechanical connection. One such mechanical connection may comprise a finger formed on each of the segments being pressed into a corresponding slot formed in each terminal.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, the total number of brush assemblies may be not equal to the total number of permanent magnets or stator poles.

The invention claimed is:

1. An electric motor comprising:
a stator having a number of permanent magnet stator poles;
brush gear with at least two brushes; and
a rotor comprising a shaft, a rotor bracket fixed to the shaft, a ring shaped rotor core fixed to the rotor bracket, a commutator fixed to the shaft and arranged inside the rotor core, and rotor windings wound on the rotor core and electrically connected to the commutator, the commutator comprising an electrically insulating body, a plurality of segments spaced on the body, and a plurality of terminals respectively electrically connected to the segments, each terminal having a connecting portion for engaging a lead wire of the rotor windings,
wherein a radially outer surface of the rotor bracket is press-fitted to a radially inner surface of the rotor core.

2. The motor of claim 1, wherein the rotor bracket is fixed to the rotor core at one axial end of the rotor core.

3. The motor of claim 1, wherein the rotor bracket comprises a support press-fitted to the rotor core, and an overmould member overmolded on the support.

4. The motor of claim 3, wherein the rotor bracket is fixed to the shaft by a shaft sleeve at least partially embedded in the overmould member.

5. The motor of claim 3, wherein the terminals of the commutator are partly embedded in the overmould member, with the connecting portions and the segments being arranged on opposite sides of the overmould member.

6. The motor of claim 3, wherein the overmould member and the body are integrally formed.

7. The motor of claim 3, wherein the overmould member is molded to an inner surface of the body.

8. The motor of claim 1, wherein the brushes are arcuate and disposed in an annular space defined by the rotor bracket, the rotor core and the commutator.

9. The motor of claim 1, wherein at least one inclined opening is formed in the rotor bracket.

10. A fan for an engine cooling system for a vehicle, comprising:
a hub;
a plurality of blades outwardly extending from the hub; and
the electric motor of claim 1,
wherein the hub is fixed to the shaft to rotate there with.

11. The motor of claim 10, wherein the rotor bracket is fixed to the rotor core at one axial end of the rotor core.

12. The motor of claim 10, wherein the rotor bracket comprises a support press-fitted to the rotor core, and an overmould member overmolded on the support.

13. The motor of claim 12, wherein the rotor bracket is fixed to the shaft by a shaft sleeve at least partially embedded in the overmould member.

14. The motor of claim 12, wherein the terminals of the commutator are partly embedded in the overmould member, with the connecting portions and the segments being arranged on opposite sides of the overmould member.

15. The motor of claim 12, wherein the overmould member and the body are integrally formed.

16. The motor of claim 12, wherein the overmould member is molded to an inner surface of the body.

17. The motor of claim 10, wherein the brushes are arcuate and disposed in an annular space defined by the rotor bracket, the rotor core and the commutator.

18. The motor of claim 10, wherein at least one inclined opening is formed in the rotor bracket.

* * * * *